United States Patent
Li et al.

(10) Patent No.: US 11,603,857 B1
(45) Date of Patent: Mar. 14, 2023

(54) TURBOCHARGER TURBINE WHEEL

(71) Applicant: Garrett Transportation I Inc., Torrance, CA (US)

(72) Inventors: Penny Li, Shanghai (CN); Annie Li, Shanghai (CN)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/677,155

(22) Filed: Feb. 22, 2022

(51) Int. Cl.
  F04D 29/28 (2006.01)
  F04D 29/42 (2006.01)
  F04D 17/10 (2006.01)
  F01D 5/14 (2006.01)
  F02B 37/00 (2006.01)
  F04D 29/24 (2006.01)

(52) U.S. Cl.
  CPC ........... F04D 29/284 (2013.01); F04D 17/10 (2013.01); F04D 29/4206 (2013.01); F01D 5/141 (2013.01); F02B 37/00 (2013.01); F04D 29/242 (2013.01)

(58) Field of Classification Search
  CPC .... F04D 29/284; F04D 17/10; F04D 29/4206; F04D 29/242; F01D 5/141; F02B 37/00
  See application file for complete search history.

(56) References Cited

U.S. PATENT DOCUMENTS

2021/0032993 A1  2/2021  Mohamed

*Primary Examiner* — Audrey B. Walter
*Assistant Examiner* — Edward Bushard
(74) *Attorney, Agent, or Firm* — Brian J. Pangrle

(57) ABSTRACT

A turbocharger turbine wheel can include a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes an inducer portion and an exducer portion, where, in the inducer portion, in a direction outwardly from the hub, each of the blades includes positive lean angles, a zero lean angle and negative lean angles and where, in the exducer portion, in a direction outwardly from the hub, each of the blades includes negative lean angles, a zero lean angle and positive lean angles.

17 Claims, 13 Drawing Sheets

TURBOCHARGER TURBINE WHEEL

TECHNICAL FIELD

Subject matter disclosed herein relates generally to turbocharger turbine wheels for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a SWA may be expected to rotate at speeds in excess of 200,000 rpm.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
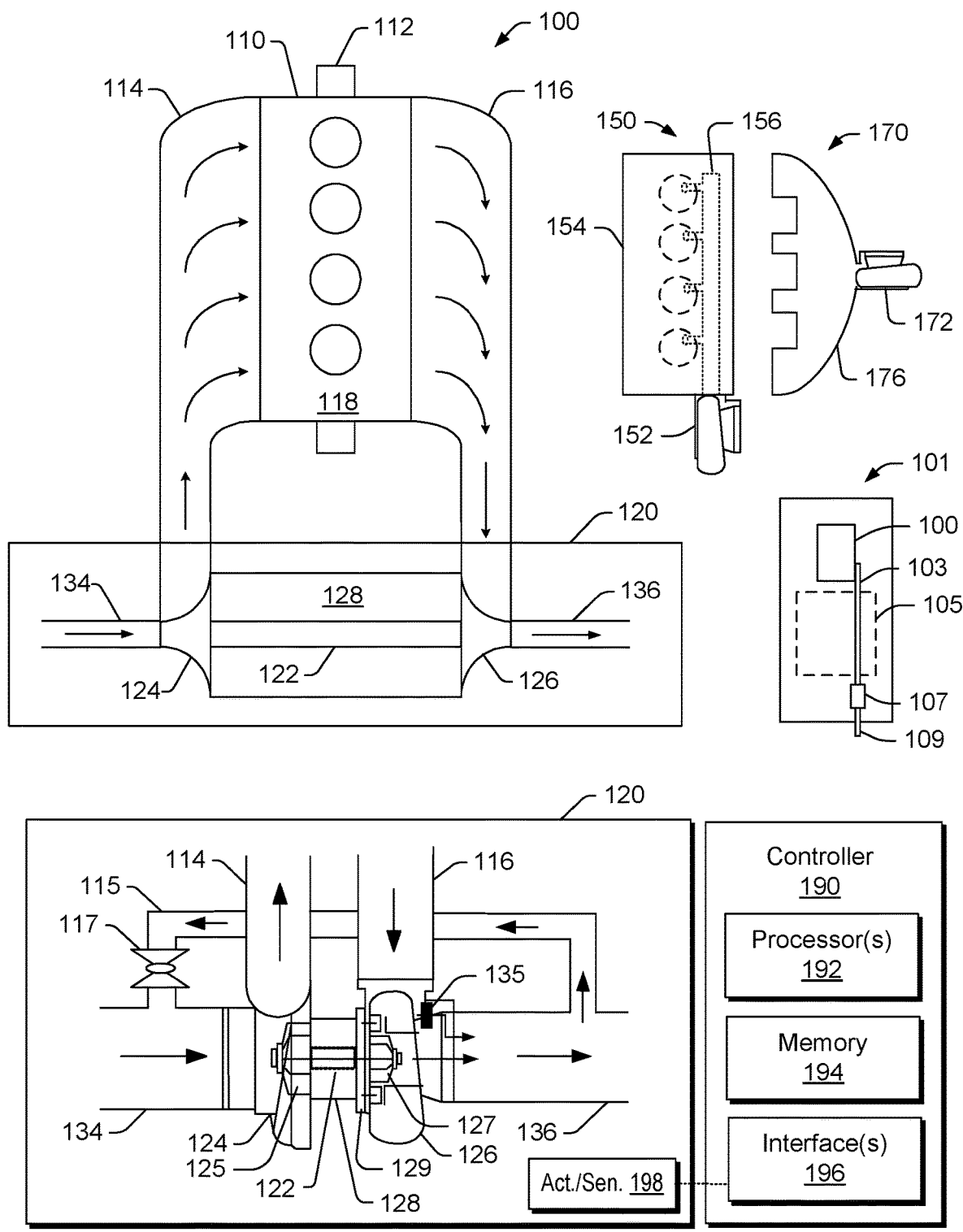
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
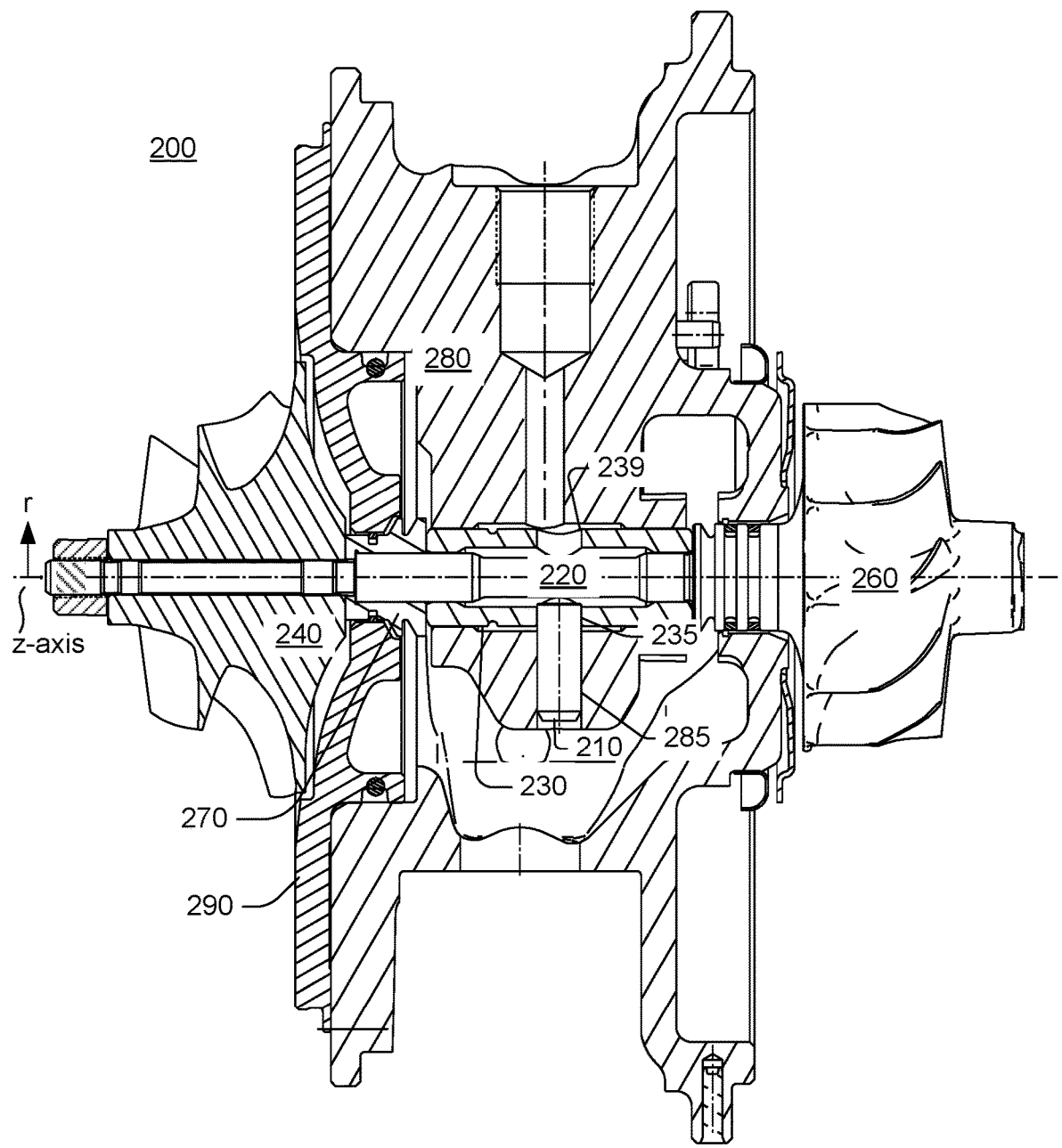
FIG. 2 is a cross-sectional view of an example of a turbocharger assembly and an end view and a cross-section view of an example of a journal bearing.

FIG. 2 shows an example of a turbocharger assembly 200 that includes a shaft 220 supported by a journal bearing 230 disposed in a center housing 280 between a compressor wheel 240 and a turbine wheel 260; noting that a thrust spacer 270 is shown as being positioned between the compressor wheel 240 and a shoulder of the shaft 220 with respect to a bore of a backplate 290. As shown in FIG. 2, the shoulder is formed by a step in diameter of the shaft 220 from a smaller diameter to a larger diameter, forming an annular axial face (e.g., a compressor side face). In the example of FIG. 2, the thrust spacer 270 abuts the axial face of the shaft 220 on one side and abuts an annular axial face of the compressor wheel 240 on an opposing side. The journal bearing 230 is located at least partially in a through bore of the center housing 280 via a locating pin 210. The locating pin 210 may be secured by being screwed into a socket 285 of the housing 280 and may be received by an aperture 235 of the journal bearing 230 to thereby locate the journal bearing 230 in the through bore of the center housing 280. As an example, the locating pin 210 may axially and azimuthally locate the journal bearing 230 in the through bore of the center housing 280.

As an example, the journal bearing 230 may move radially within the through bore of the center housing 280, for example, the journal bearing 230 may move up and down radially with respect to an axis of the locating pin 210 while being limited axially and azimuthally by the locating pin 210 (e.g., the journal bearing 230 may be a semi-floating journal bearing).

The turbocharger assembly 200 of FIG. 2 can be oil cooled as well as air cooled, for example, by being in an environment with ambient air or vehicle engine compartment air. A turbocharger may be cooled via one or more mechanisms. For example, a turbocharger may be cooled via air, water, oil or other fluid. As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system.

To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled; consider, as an example, a diesel engine with exhaust that may be at about 860 degrees C. and consider, as an example, a gasoline engine with exhaust that may be at about 1050 degrees C. Thus, a turbocharger that is in fluid communication with exhaust of a gasoline fueled internal combustion engine can experience higher temperatures when compared to a diesel fueled internal combustion engine. Further, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

Figure 3:
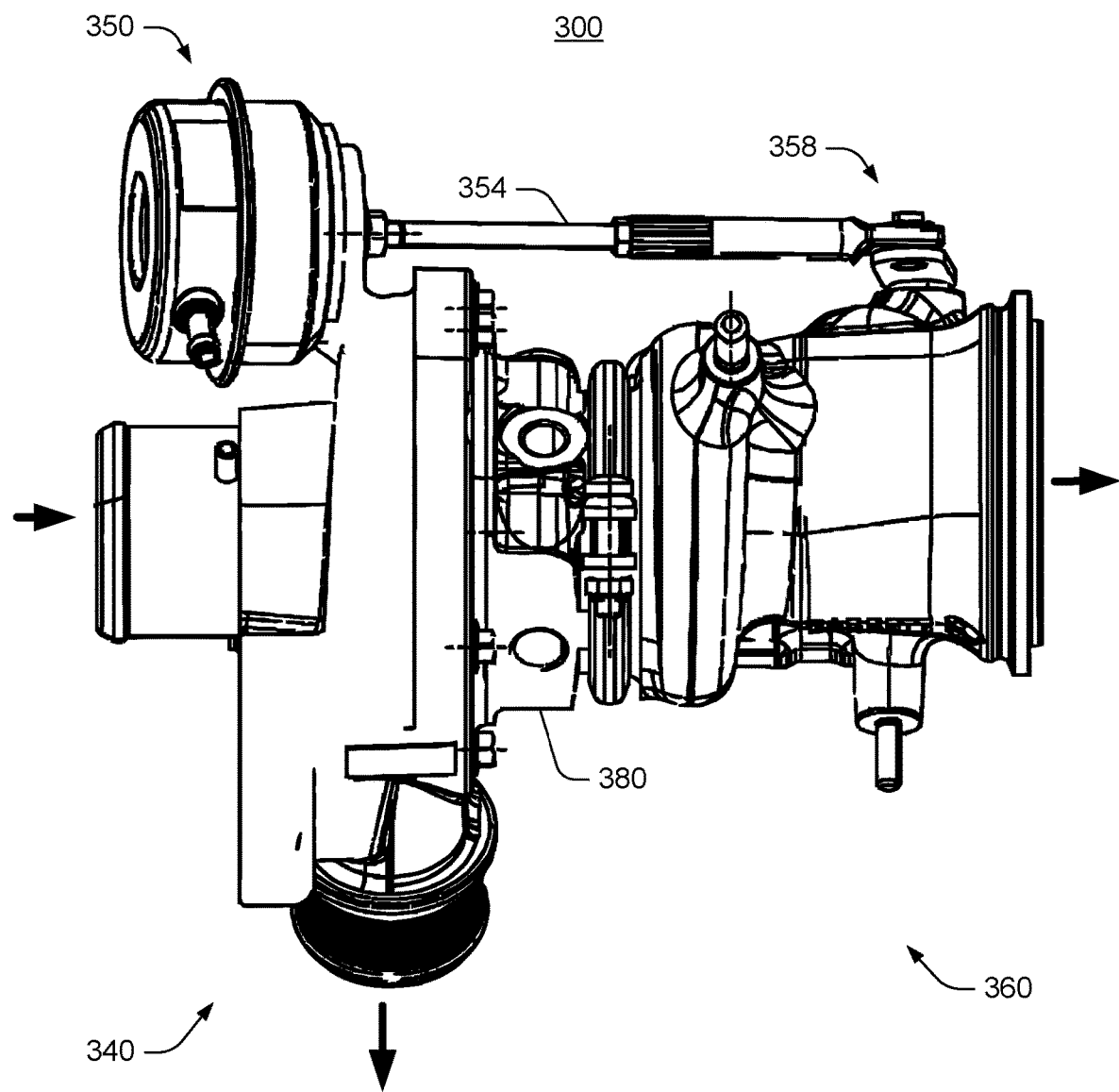
FIG. 3 is a side view of an example of a turbocharger.

FIG. 3 shows an example of a turbocharger 300 that includes a compressor assembly 340 with a compressor housing for a compressor wheel, a turbine assembly 360 with a turbine housing for a turbine wheel, a center housing 380 for a bearing, bearings or a bearing assembly to rotatably support a shaft of a shaft and wheel assembly (SWA), and an actuator 350 with a linkage 354 to a control arm assembly 358 for a wastegate of the turbine assembly 360. The turbocharger 300 can include one or more of the components shown in FIG. 2. In the view of FIG. 2, the exhaust inlet of the turbine assembly 360 is not visible because it is on the opposite side. General directions of flow of air or exhaust are indicated by arrows. The actuator 350 is shown as being mounted to the compressor assembly 340, which can help to reduce temperatures experienced by the actuator 350 (e.g., compared to having the actuator mounted on a turbine housing). The turbocharger 300 can be part of a vehicle such as, for example, the vehicle 101 of FIG. 1. As an example, the turbine assembly 360 may optionally be arranged such as in one of the example arrangements 150 or 170 of FIG. 1.

Figure 4:
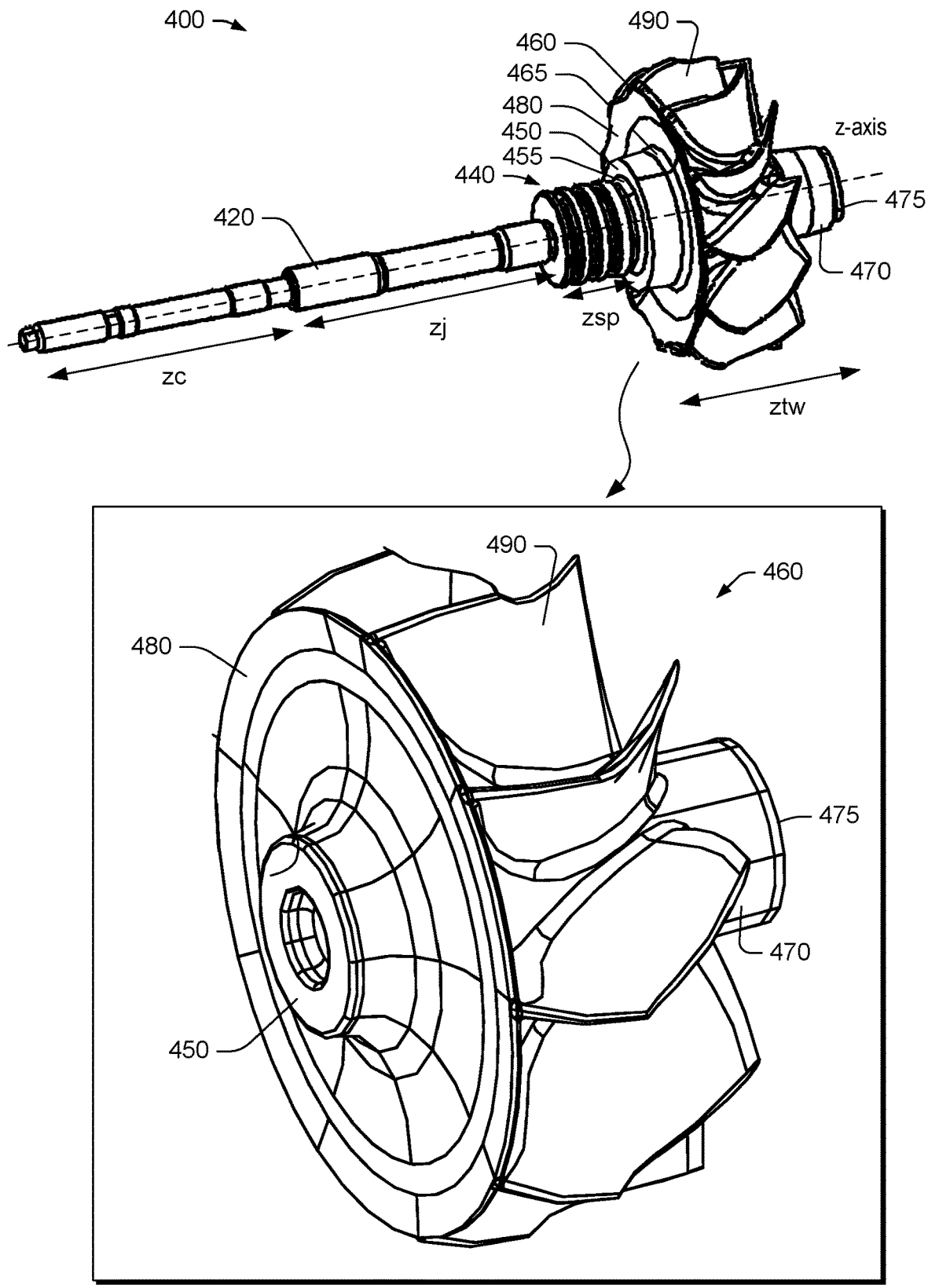
FIG. 4 is a perspective view and an enlarged view of an example of a shaft and wheel assembly (SWA)

FIG. 4 shows a perspective view of a shaft and wheel assembly (SWA) 400. As shown, the SWA 400 includes a shaft 420, a seal portion 440 and a turbine wheel 460 where the turbine wheel 460 includes a nose 470, a backdisk 480 and blades 490. The turbine wheel 460 can be a single, unitary piece of material and referred to as a single component or a single piece. A portion of the turbine wheel 460 can be referred to as a hub 465. For example, the backdisk 480 can be a part of the hub 465 from which the blades 490 extend. The hub 465 can include the backdisk 480 and the nose 470 and extend the length of the turbine wheel as indicated by an axial length ztw as measured along a rotational z-axis of the SWA 400.

As an example, the seal portion 440 can be formed in part by the turbine wheel 460 and in part by the shaft 420, can be formed by the shaft 420 or can be formed by the turbine wheel 460. As an example, the seal portion 440 can be formed at least in part by the shaft 420. The seal portion 440 can be defined by an outer radius.

As shown in FIG. 4, the SWA 400 can include a shoulder or step down from the turbine wheel 460 toward the shaft 420. For example, a shoulder can step down from an outer surface of the shaft joint portion 450 to an outer surface 455, which may be at a radius equal to or approximately equal to that of the seal portion 440. The shaft joint portion 450 can include a surface that is an annular axial face that can form a portion of a shoulder.

As an example, the shaft joint portion 450 can include a shaft joint surface that can be defined in part by a shaft joint radius. For example, consider a shaft joint surface that can be utilized to join a shaft to a turbine wheel (e.g., via welding, etc.). In such an example, the shaft joint surface of the turbine wheel can be a mating surface that mates with a turbine wheel joint surface of a shaft where the two surfaces can be brought into proximity or direct contact and joined (e.g., via welding). As an example, a shaft joint surface may be an annular surface that can be welded to a surface of a shaft to form a SWA (e.g., to form a weld or welds).

The SWA 400 can include dimensions such as, for example, axial dimensions for a compressor wheel portion zc, which may include one or more pilot surfaces, a set of threads, etc., and a bearing portion zj, which may include one or more journal surfaces (e.g., a compressor side journal surface and a turbine side journal surface, etc.).

As shown in FIG. 4, the seal portion 440 can include one or more annular grooves that may be configured to receive one or more seal elements (e.g., one or more seal rings). As shown, the seal portion 440 can be defined in part by an axial dimension zsp. As an example, a seal element can be a split ring such as, for example, a piston ring. As mentioned, a SWA may be formed by welding a shaft to a turbine wheel such that the resulting SWA has a shaft and a turbine wheel arranged and fixed along a common rotational axis.

FIG. 4 shows an enlarged perspective view of a portion of the SWA 400, specifically the turbine wheel 460. As an example, a turbine wheel may be defined using diameters, which can be circles that inscribe features of the turbine wheel. For example, where a turbine wheel includes an odd number of blades, a diameter as a line may not be drawn from a leading edge of one blade to a leading edge of another blade. In such an example, diameter can be defined via a circle that inscribes the leading edges of the blades or, for example, mathematically, as twice a radius. A turbine wheel may be defined by an inducer diameter (e.g., associated with exhaust inflow) and an exducer diameter (e.g., associated with exhaust outflow). As an example, an inducer diameter can exceed an exducer diameter. As an example, a trim of a turbine wheel can be defined using its inducer diameter and its exducer diameter. Where diameter is mentioned, it may refer to a diameter of a circle that can be drawn with respect to features of a turbine wheel. As an example, a turbine wheel may be defined in a cylindrical coordinate system that includes axial, radial and azimuthal coordinates (e.g., r, z, and $\Theta$).

As an example, a balancing process may alter one or more dimensions of a turbine wheel, for example, via removal of material. For example, consider removal of material from the nose 470 of the turbine wheel 460 of the SWA 400. As shown, the nose 470 has an outer diameter that is less than an outer diameter of the backdisk 480. Another option can be to remove material from the backdisk 480. As an example, material may be removed from the shaft joint portion 450. In such an example, material removal may have minimal impact on the backdisk 480 as to its ability to support the blades 490.

As shown in the example of FIG. 4, an exhaust turbocharger turbine wheel 460 can include the hub 465 that includes the nose 470, the backdisk 480, a shaft joint portion 450 (e.g., as part of the backdisk 480) and a rotational axis (z-axis); the blades 490 that extend from the hub 465 to define exhaust flow channels where each of the blades 490 includes a leading edge, a trailing edge, a hub profile, a shroud profile, a pressure side, and a suction side; where the backdisk 480 includes an outer perimeter radius measured from the rotational axis of the hub 465 and an intermediate radius at an outer perimeter of the shaft joint portion 450 measured from the rotational axis of the hub 465.

As to the shaft joint portion 450, it is shown as being substantially cylindrical. As an example, the backdisk 480 can be defined as a lower portion of the hub 465 that includes at least part of the shaft joint portion 450 and that extends outwardly to a maximum outer perimeter of the backdisk 480.

As explained, the shaft joint portion 450 can join the seal portion 440, which may be an integral part of the shaft 420. As an example, the seal portion 440 can be welded to the shaft joint portion 450 to form a welded joint that is to permanently join the shaft 420 and the turbine wheel 460 to form the shaft and wheel assembly (SWA) 400.

With reference to FIG. 2, a seal portion is shown as being part of the shaft 220 and as being joined to the turbine wheel 260 to form a SWA. The seal portion can include one or more annular grooves as shown in FIG. 2 where one or more corresponding seal elements (e.g., seal rings) can be disposed at least in part therein to form a seal or seals between a lubricant region of the center housing 280 and an exhaust region in which the turbine wheel 260 is disposed. As shown, the center housing 280 includes a turbine side bore in which the seal portion and the seals are seated. The bore includes a bore wall where the seals may contact the bore wall (e.g., consider piston rings as split rings that can be compressed during installation and then expand once installed to form seals).

As an example, a shaft may be made of a material that is the same as that of a turbine wheel or that is different from that of a turbine wheel. Where materials differ, the materials can generally be amenable to welding such that a SWA can be formed. As mentioned, a compressor wheel may be manufactured from a material that has a lesser specific gravity than a material of a turbine wheel. In general, a compressor wheel experiences operational temperatures that are less than those of a turbine wheel. As an example, a turbine wheel can be made of a nickel alloy. For example, consider a NiCrFe-based alloy (e.g., HASTALLOY™ material, INCONEL™ material, etc.) or another alloy. In contrast, a compressor wheel may be made of a lighter material such as, for example, aluminum or an aluminum alloy. A turbine wheel material may have a specific gravity that is double or more than double that of aluminum (approximately 2.7 versus approximately 8.4 for INCONEL™ 625 material).

In FIG. 2, a rotating assembly can include the shaft 220 and the turbine wheel 260 as an SWA along with the compressor wheel 240 and a nut (e.g., for a compressor wheel with a through bore). As an example, a so-called boreless compressor wheel may be utilized where the compressor wheel can join to a shaft without use of an end nut.

A rotating assembly can have a mass defined by a sum of individual masses of components that make up the rotating assembly. As mentioned, flow of exhaust to an exhaust turbine disposed in a turbine housing can be a driver for rotation of a rotating assembly where mass and other factors can determine how much exhaust must flow before rotation commences.

Figure 5:
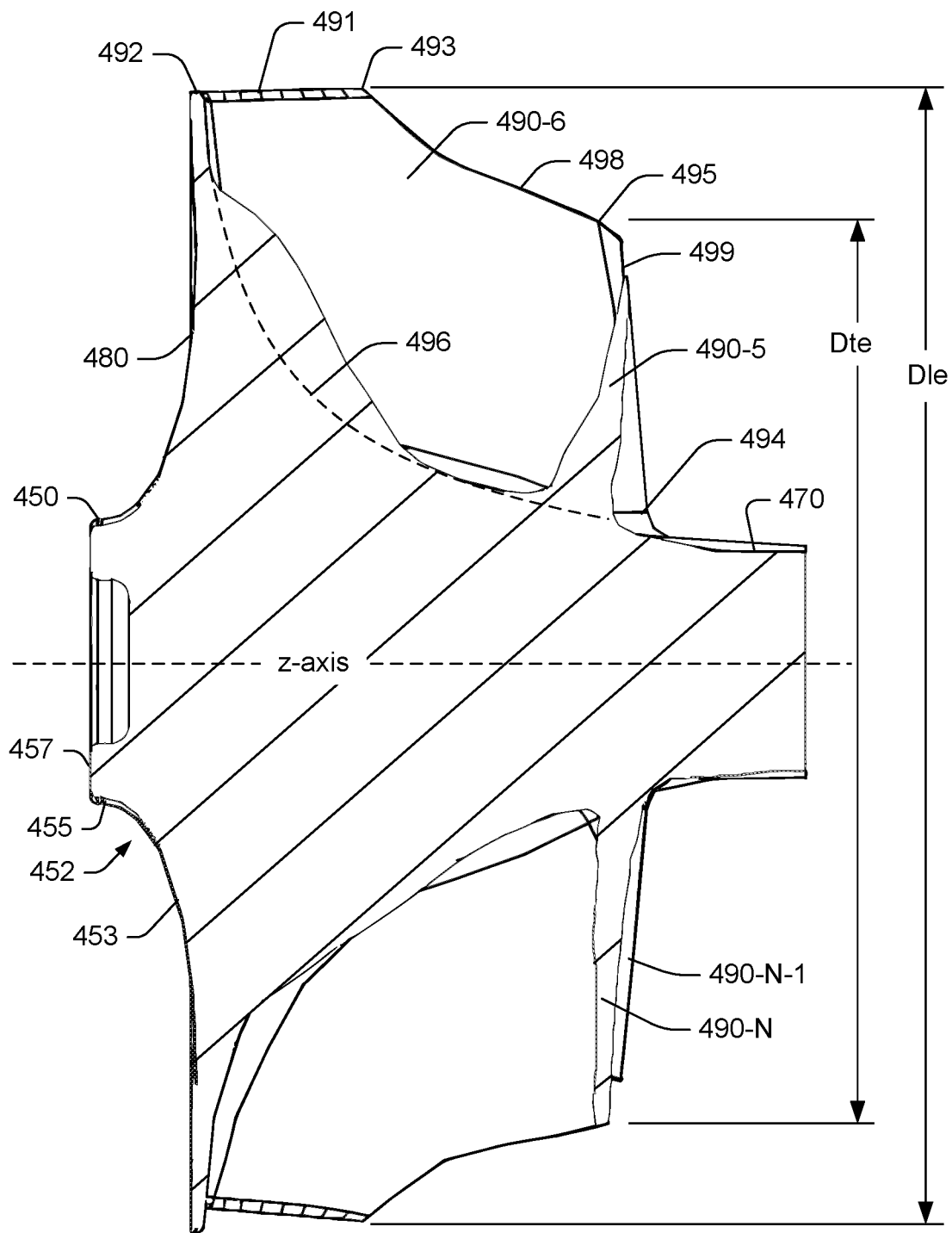
FIG. 5 is a cross-sectional, cutaway view of an example of a turbine wheel.

FIG. 5 shows the example turbine wheel 460 in a cross-sectional, cutaway view. FIG. 5 shows the shaft joint portion 450 with a shoulder 452 and surfaces 453, 455 and 457. As shown, the surface 457 can be a surface that is a mating surface for joining a shaft to the shaft joint portion 450 of the turbine wheel 460. As mentioned, the outer diameter of the shaft joint portion 450 at the surface 455 may be approximately the same as that of a seal portion (see, e.g., the seal portion 440).

As shown in the example of FIG. 5, the turbine wheel 460 includes various blade features such as a leading edge 491 (or inducer edge), a trailing edge 499 (or an exducer edge), a backdisk point 492 of the leading edge 491, a tip point 493 of the leading edge 491, a hub point 494 of the trailing edge 499 and a tip point 495 of the trailing edge 499. As shown, the turbine wheel 460 has a blade outer diameter at the tip point 493 of the leading edge 491 (e.g., inducer edge); another blade outer diameter at the tip point 495 of the trailing edge 499 (e.g., exducer edge); and a blade diameter at the hub point 494 at the trailing edge 499 (e.g., exducer edge).

As mentioned, a circle may inscribe blade features to define a diameter. In FIG. 5, the diameters Dle (diameter leading edge) and Dte (diameter trailing edge) are not shown as corresponding to circles but rather as corresponding to the particular cross-section, where a circle would have a slightly larger diameter than Dle and another circle would have a slightly larger diameter than Dte.

As shown in the example of FIG. 5, a dashed line represents a hub profile 496 of the blade 490-5 while a solid line 498 represents at least a portion of a shroud profile of the blade 490-5.

Figure 6:
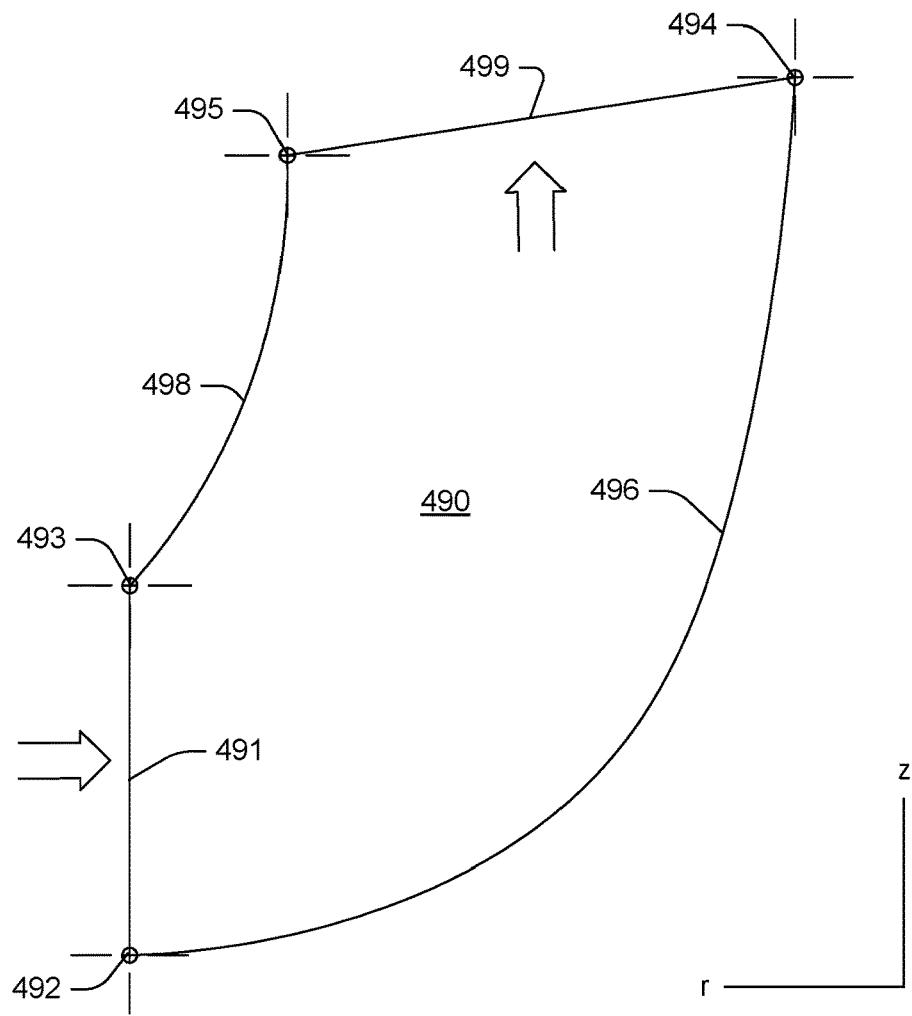
FIG. 6 is a projected view of an example of a blade of a turbine wheel with a radial inflow leading edge and a projected view of an example of a blade of a turbine wheel with a mixed-flow inflow leading edge.
Figure 6:
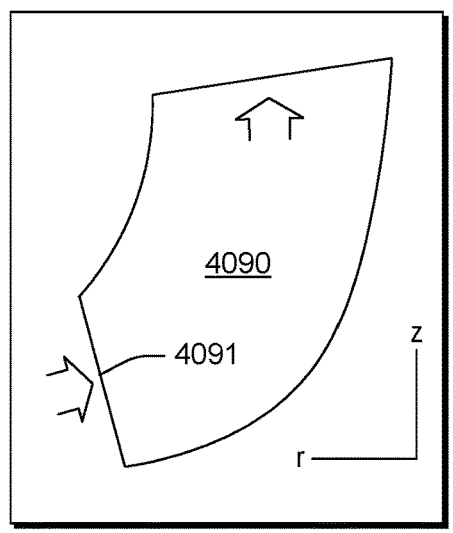

FIG. 6 shows a plan view of an example of the blade 490, along with various points and profiles described with respect to FIG. 5. FIG. 6 also shows arrows that indicate intended direction of flow of exhaust, from the leading edge 491 to the trailing edge 499 where two adjacent blades define a flow channel for exhaust (e.g., an exhaust flow channel). As mentioned, one side of a blade can be defined as a pressure side while an opposing side of the blade can be defined as a suction side. The plan view of FIG. 6 is a projected view such that the concave and convex shapes of the blade 490 are not seen. In FIG. 6, the blade 490 can be defined with respect to radial and axial coordinates. As an example, a polar angle plot may be utilized to provide for additional information that defines the blade 490. For example, consider a plot of wrap angle along a camber line. As an example, the blade 490 may be defined using one or more equations, parameters, etc., of an airfoil or an impeller.

As an example, a turbine wheel can be a radial flow turbine wheel (e.g., radial inlet flow) or can be a mixed-flow turbine wheel (e.g., mixed inlet flow) where an angle can define at least a portion of a leading edge such that incoming exhaust has both a radial component and an axial component. FIG. 6 shows an example of a mixed-flow turbine wheel blade 4090 where a leading edge 4091 is at an angle other than 90 degrees with respect to the r-axis and is at an angle other than 0 degrees with respect to the z-axis (e.g., approximately 1 degree to approximately 89 degrees). As an example, a turbine wheel blade may be radially stacked or not radially stacked (e.g., non-radially stacked).

Figure 7:
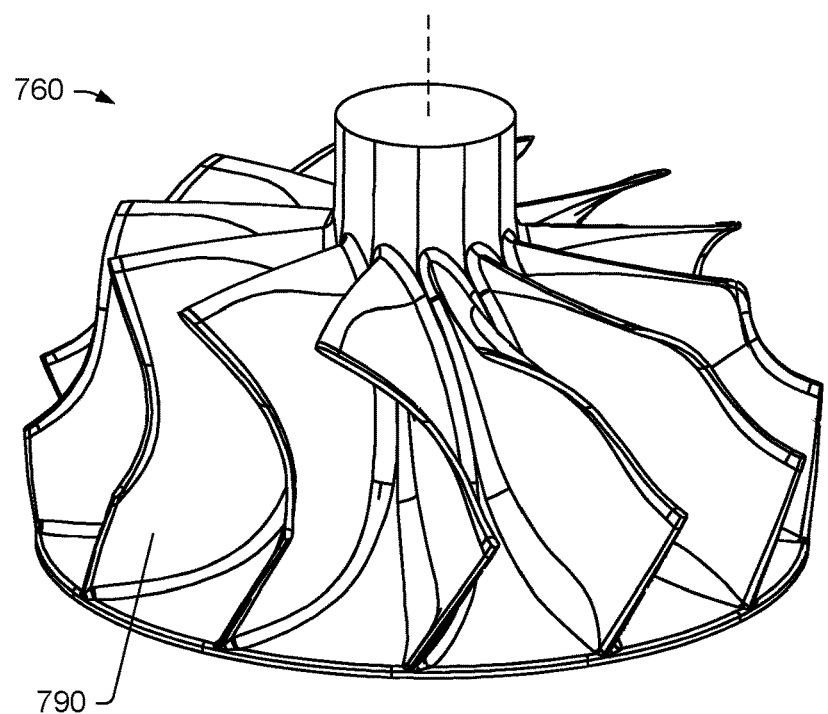
FIG. 7 is a series of perspective views of an example of a turbine wheel.
Figure 7:
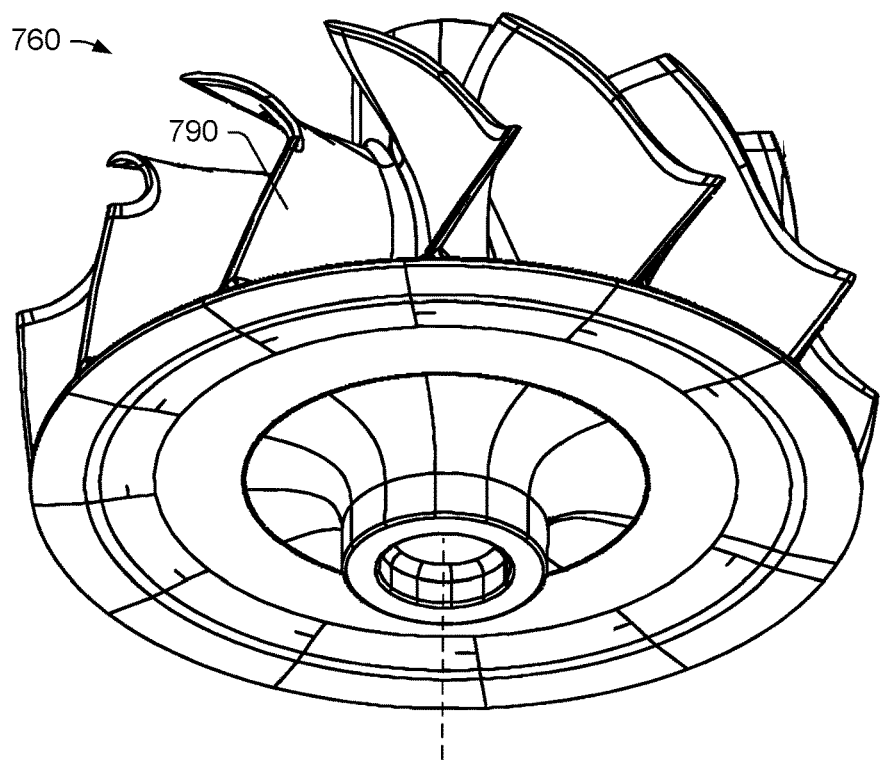

FIG. 7 shows two perspective views of an example of a turbine wheel 760 where the example turbine wheel 760 includes twelve blades, one of which is labeled as a blade 790; noting that a turbine wheel may include a number of blades, for example, in a range from approximately 5 blades to approximately 30 blades. In the example of FIG. 7, the turbine wheel 760 may be a mixed flow turbine wheel; noting that a turbine wheel may be a radial flow turbine wheel.

Figure 8:
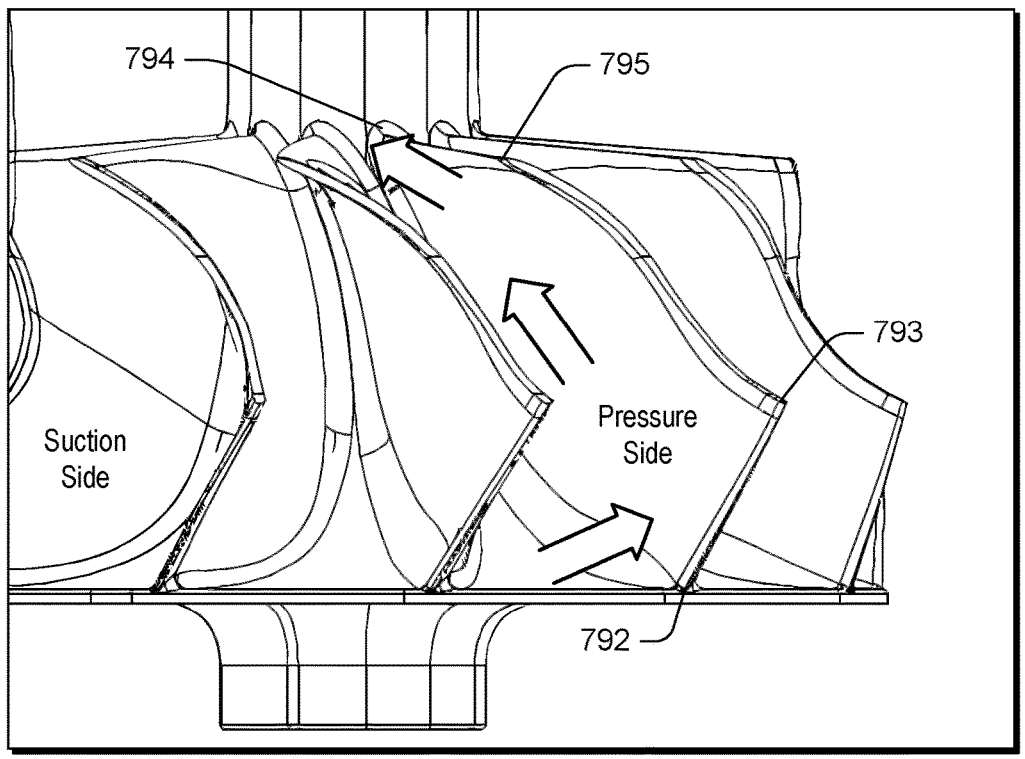
FIG. 8 is a series of views of blades of the turbine wheel of FIG. 7.
Figure 8:
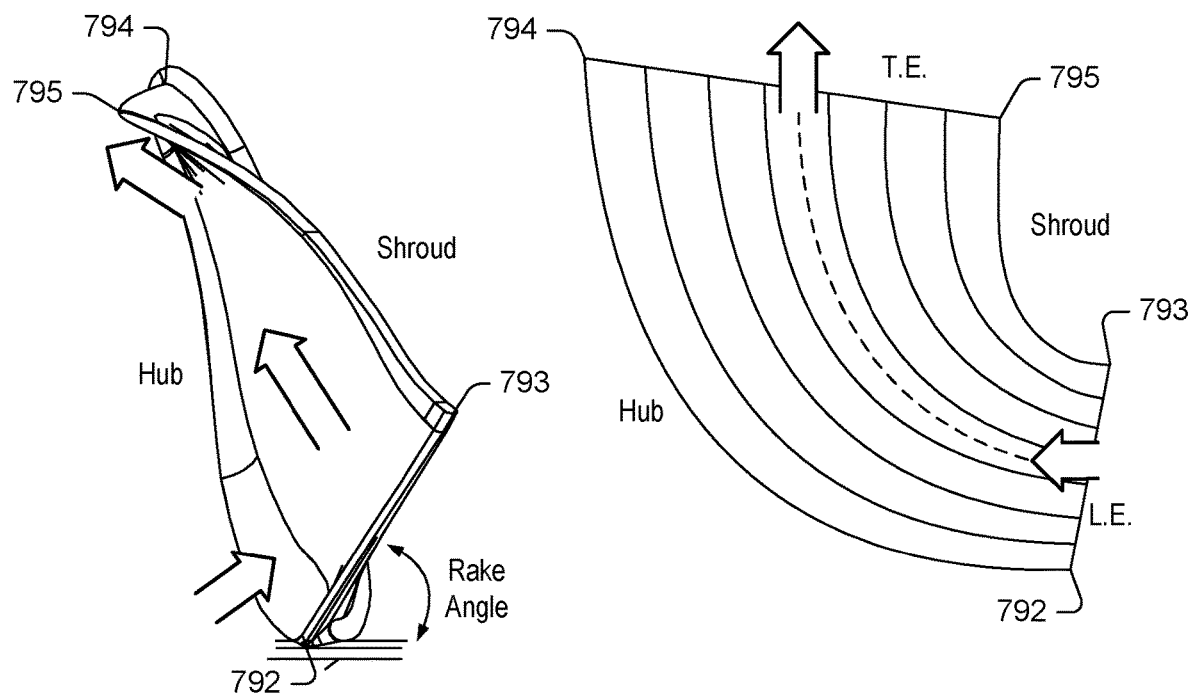

FIG. 8 shows an enlarged side view of the turbine wheel 760 along with a view of one blade such as the blade 790 and a projected view of one blade such as the blade 790, along with general directions of gas flow. In the projected view (lower right), the dashed line represents a meridional line that extends from the leading edge (L.E.) to the trailing edge (T.E.) between the hub profile and the shroud profile. As an example, one or more features of a blade may be described with respect to a meridional line, a meridional coordinate, etc. For example, consider a normalized meridional coordinate system that is zero at the leading edge and unity (one) at the trailing edge. In FIG. 8, the various points 792, 793, 794 and 795 may be understood with reference to the points 492, 493, 494 and 495 of FIGS. 5 and 6. Various other features described with respect to FIGS. 4, 5 and 6 may be utilized to describe various features of the turbine wheel 760 of FIG. 7.

In the example of FIG. 8, the blade 790 may be defined in part with respect to a rake angle (lower left), which can be defined using a backdisk plane where the rotational axis of the turbine wheel 760 is normal to the backdisk plane. As shown, the rake angle can be defined via the points 792 and 793 on the leading edge of the blade 790 (e.g., and points between the points 792 and 793). As shown, the rake angle is less than 90 degrees such that the point 793 is offset in an intended direction of rotation from the point 792.

As an example, a turbine wheel can include features such as a special non-radial element and theta distribution. Such features can provide for a substantial increase in performance (e.g., an increase in efficiency). As explained, turbine wheels can be expected to operate at high rotational speeds that can be in excess of 100,000 rpm, 200,000 rpm or more. Under such conditions, mechanical properties of a turbine wheel are expected to be acceptable (e.g., low cycle fatigue (LCF) and high cycle fatigue (HCF)), particularly where a non-radial element(s) exists.

As an example, a turbine wheel can include blades where each blade includes maximum radial element angle that is less than approximately 10 degrees at a leading edge with a reduction at a trailing edge of approximately 0 degrees to −10 degrees, where, for example, span distribution may be linear and/or non-linear.

As an example, a lean angle at a trailing edge of a blade can be in a range from approximately −10 degrees to approximately 0 degrees, where, for example, span distribution can be linear and/or non-linear.

As an example, rake angle at a leading edge of a blade can be in a range from approximately 25 degrees to approximately 80 degrees. As an example, a rake angle at a leading edge of a blade can be in a range from approximately 30 degrees to approximately 70 degrees, where, for example, span distribution can be linear and/or non-linear.

As an example, a turbine wheel can include blades where each blade includes a hub-shroud lean angle distribution in a range from approximately −10 degrees to 10 degrees within an inducer portion, where, for example, span distribution can be linear and/or non-linear. In such an example, the blade includes both negative and positive lean angles in the inducer portion.

As an example, a turbine wheel can include blades where each blade includes a hub-shroud lean angle distribution in a range from approximately −10 degrees to 10 degrees within an exducer portion, where, for example, span distribution can be linear and/or non-linear. In such an example, the blade includes both negative and positive lean angles in the exducer portion.

As an example, a turbine wheel can include blades where each blade includes a maximum radial elements angle (e.g., theta difference) that is less than or equal to approximately 10 degrees at a leading edge of the blade that reduces to approximately 0 degrees to approximately −10 degrees at the trailing edge, where, for example, span distribution can be linear and/or non-linear. Such a turbine wheel may be tool pullable.

Figure 9:
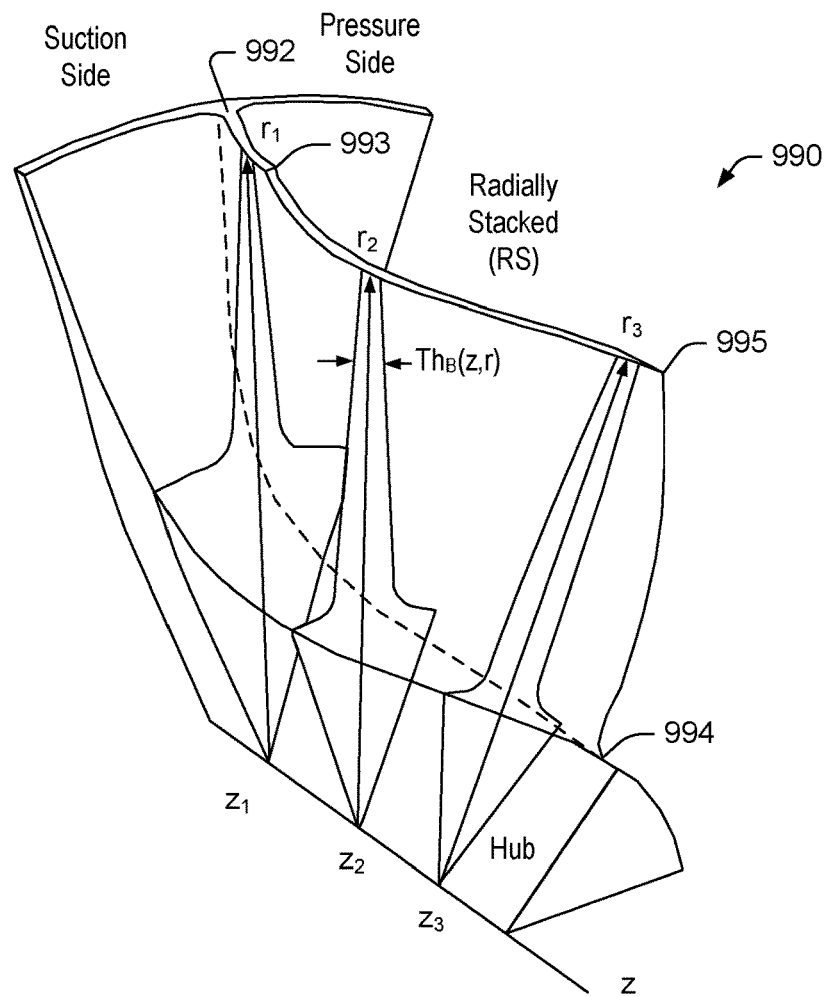
FIG. 9 is a series of views of portions of examples of turbine wheels.
Figure 9:
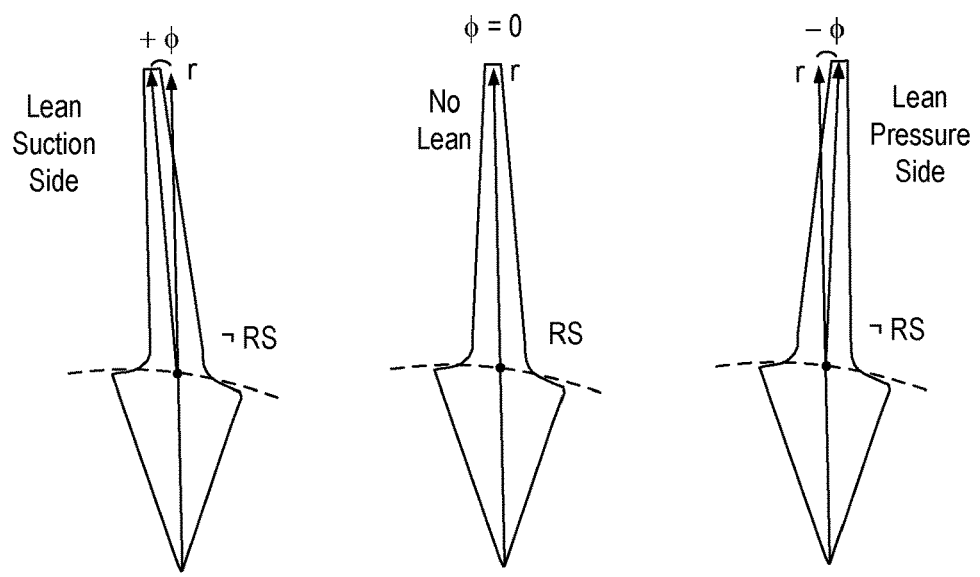

FIG. 9 shows an example of a blade 990 as a section of a turbine wheel that includes a plurality of blades. As shown, the blade 990 includes various points 992, 993, 994 and 995, which may be defined in a cylindrical coordinate system. In the example blade 990 of FIG. 9, three radial lines are shown, labeled $r_1$, $r_2$ and $r_3$, which have corresponding axial coordinates $z_1$, $z_2$ and $z_3$, where each of the three radial lines may be referred to as a radial fiber. In FIG. 9, at three different r, Θ planes at $z_1$, $z_2$ and $z_3$, cross-sectional areas and shapes of the hub and the blade 990 are illustrated. As an example, a blade can be defined in part by a thickness, which can be shown as the thickness $Th_B(z,r)$ at a particular axial dimension and a particular radial dimension. A blade thickness can be a distance that is between a pressure surface (e.g., a pressure side) and a suction surface (e.g., a suction side) of a blade. In the example of FIG. 9, the blade 990 can have a thickness that various in different regions. As an example, a blade may be thinner at a shroud edge (e.g., along a shroud profile) and thicker at a hub edge (e.g., along a hub profile). As shown in FIG. 9, the hub can vary in its radius where the hub can have a smaller radius near a nose and a larger radius near a base (e.g., where the blade 990 joins the backdisk).

As shown, the blade 990 is radially stacked (RS) because a radial line can be drawn from the hub to the leading edge at $z_1$, $r_1$, from the hub to the shroud edge at $z_2$, $r_2$, and from the hub to the shroud edge at $z_3$, $r_3$. In FIG. 9, the radial lines have their origin along the z-axis, which is the rotational axis of a turbine wheel that includes the blade 990. Radial stacking can be beneficial with respect to stresses of a turbine wheel as radial stacking helps to reduce excessive blade stresses at high rotational speeds (e.g., rotational speeds in excess of 10,000 rpm, 100,000 rpm, 200,000 rpm or more).

In FIG. 9, the radial lines of the blade 990 are also mean lines in that each of the radial lines is centered between the suction side and the pressure side of the blade 990. Another type of line that can be utilized to describe a blade is the camber line (or camberline), which is a mean line of a blade profile that extends from the leading edge to the trailing edge, halfway between the pressure side (pressure surface) and the suction side (suction surface). In the example blade 990 of FIG. 9, a camber line or camber lines can form a camber sheet or camber surface that extends from the leading edge to the trailing edge of the blade 990 where at each axial position, a radial line extends from the hub profile to the shroud profile of the camber surface. For example, the portions of the radial lines $r_1$, $r_2$ and $r_3$ between the hub profile and the leading edge, the shroud edge and the trailing edge are all in the camber surface for the blade 990. For a given blade, where a radial line at an axial position, between the hub profile and the leading edge, the shroud profile or the trailing edge, does not coincide with the camber surface, that blade is not radially stacked.

FIG. 9 also shows two examples of non-radially stacked (¬ RS) blades, which can be defined by a lean angle. As shown, a lean angle can be defined with respect to a radial line where the lean angle can be toward a suction side or toward a pressure side. As an example, a lean angle can be defined to be positive when it is toward a suction side and negative when it is toward a pressure side. As shown, for a radially stacked blade, the lean angle is zero. As an example, a blade may be non-radially stacked and include a lean angle that is in some regions negative and in some regions positive.

As an example, a blade may be defined by an average lean angle at a particular z-axis position. For example, where a blade is curved, the lean angle can vary with respect to radial position. In such an example, a lean angle may increase and/or decrease with respect to radial position. As an example, a blade may lean toward the pressure side and then lean toward the suction side within a region that extends inwardly from the outer edge of the blade. In such an example, the blade may have a positive lean angle over a radial length and then a negative lean angle over a radial length. As an example, a blade may lean and then return to a radial line. For example, consider a blade that leans toward the pressure side and then near the outer edge is along a radial line. In such an example, the blade may have positive lean angles with respect to radial position and a zero lean angle with respect to one or more radial positions. As to an average lean angle, in such an example, a series of angles may be utilized for corresponding radial positions where the average lean angle would be positive. As mentioned, a blade may be characterized by a lean angle, which may be negative, zero or positive, where the lean angle may be an average lean angle or, for example, a local lean angle at a radial position offset from a radial line.

Figure 10:
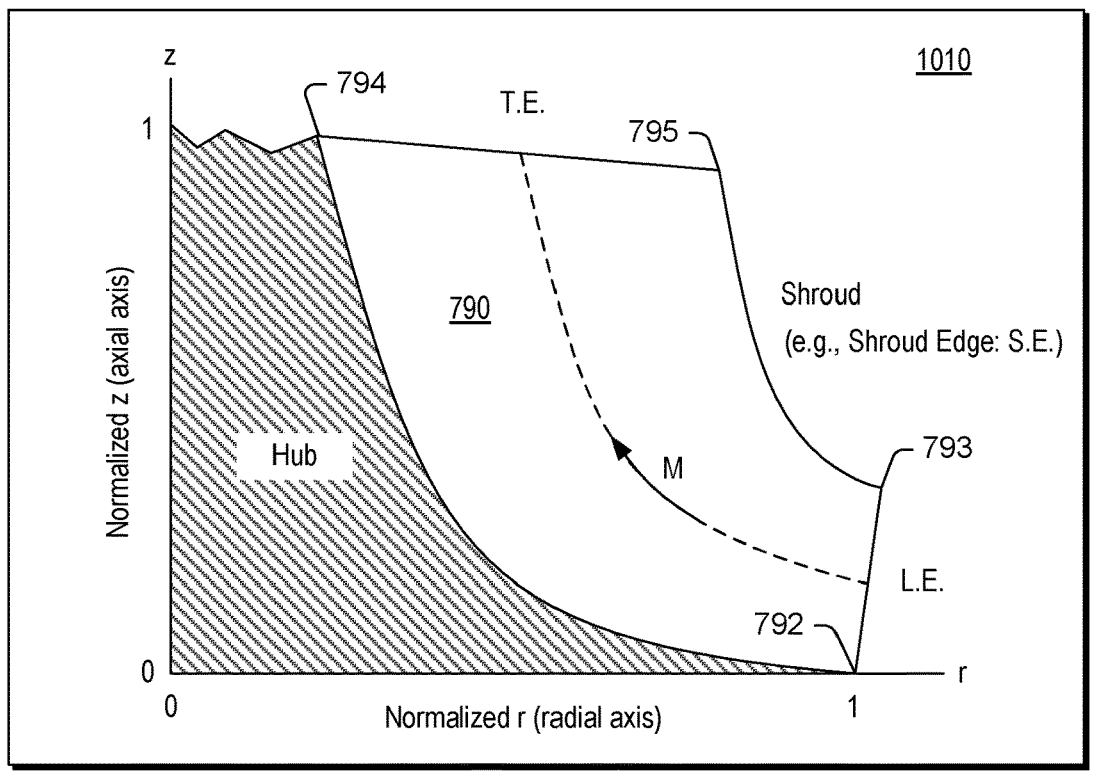
FIG. 10 is a series of plots of examples of turbine wheel blade characteristics.
Figure 10:
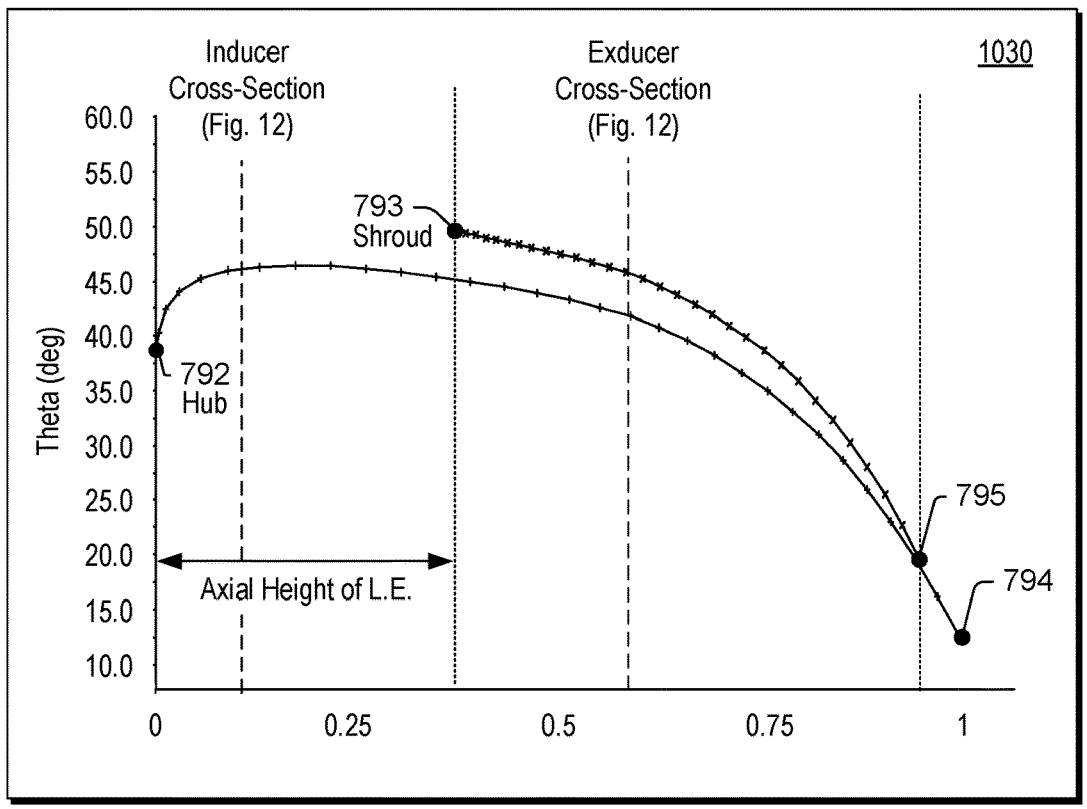

FIG. 10 shows an example plot 1010 and an example plot 1030 that correspond to the example blade 790. The plot 1010 shows a meridional line (M) along a normalized plane of the axial axis and the radial axis of a projection of the blade 790 where the hub profile and shroud profile are shown along with the leading edge (L.E.) and the trailing edge (T.E.). As shown, the shroud profile can be represented by a shroud edge (S.E.).

The plot 1030 shows the hub profile and the shroud profile with respect to theta and normalized z axial axis coordinate positions for a turbine wheel that is normalized to unity in height from the point 792 at the hub to the point 794 at the hub where height is measured with respect to the z axial axis coordinate (e.g., the rotational axis of the turbine wheel). In the plot 1030, the axial height of the leading edge (L.E.) can be defined.

As mentioned, a blade can include lean angles in an inducer portion, as may be defined by the axial height of the leading edge (L.E.), and can include lean angles in an exducer portion, as may be defined by a region axially above the inducer portion and including the trailing edged (T.E.).

As an example, lean angles in an inducer portion can commence at a lean angle of zero, become positive and then become negative. In such an example, a transition point can be defined as a point that is on a radial line with a lean angle of zero. In such an example, a blade can include two lean angles of zero where one lean angle is at the hub profile and where the other lean angle is between the hub profile and the leading edge (L.E.) (e.g., and possibly the shroud profile where the inducer portion is defined as extending axially higher than the height of the leading edge (L.E.)).

As an example, lean angles in an exducer portion can commence at a lean angle of zero, become negative and then become positive. In such an example, a transition point can be defined as a point that is on a radial line with a lean angle of zero. In such an example, a blade can include two lean angles of zero where one lean angle is at the hub profile and where the other lean angle is between the hub profile and the shroud profile (e.g., and possibly the trailing edge (T.E.) where a tip of the trailing edge (T.E.) is at an axial height that is less than the trailing edge (T.E.) at the hub).

As explained, a turbine wheel can include blades where each of the blades can include lean angles in an inducer portion that commence at a lean angle of zero, become positive and then become negative, and where each of the blades can also include lean angles in an exducer portion that commence at a lean angle of zero, become negative and then become positive. As explained, an inducer portion includes a portion of a blade that has a defining border at or less than an axial height of a leading edge (L.E.) and that extends axially downwardly from that border and an exducer portion includes a portion of a blade that has a defining border at or greater than an axial height of a leading edge (L.E.) and that extends axially upwardly from that border. As an example, a single border may define an inducer portion axially below the border toward a backdisk and an exducer portion above the border toward a nose.

Figure 11:
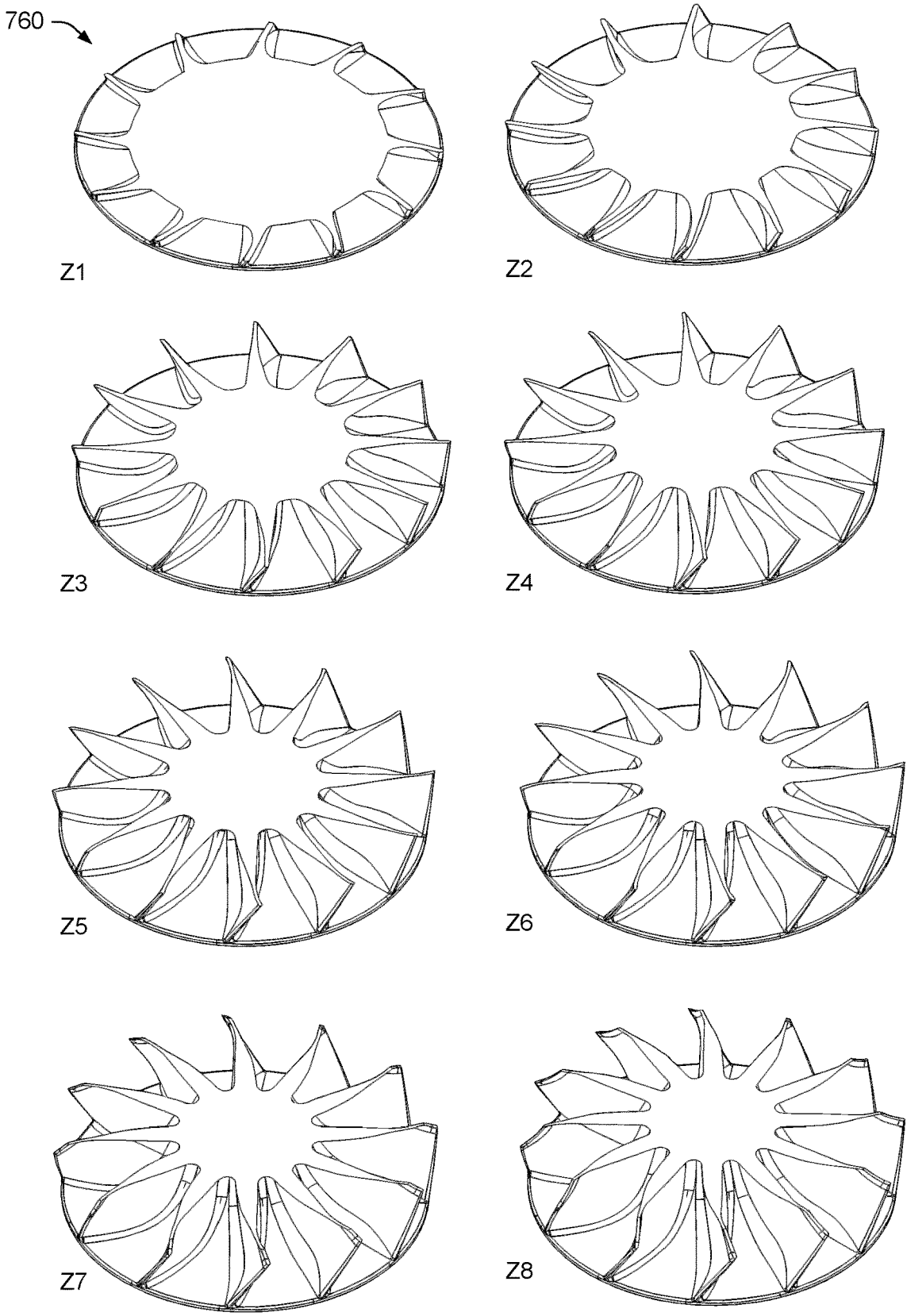
FIG. 11 is a series of perspective, cutaway views of the turbine wheel of FIG. 7.

FIG. 11 shows the turbine wheel 760 in a series of cross-sectional, cutaway views at different axial positions along a z-axis (Z1, Z2, Z3, Z4, Z5, Z6, Z7 and Z8), which is the rotational axis of the turbine wheel 760. In each of the views, a radial line can be drawn to determine whether a blade is radially stacked, not radially stacked, leaning or not leaning where leaning can be defined by one or more lean angles that include at least one non-zero lean angle at at least one radial position.

As shown, the axial position Z1 is closer to the backdisk while the axial position Z8 is closer to the nose. In each of the cutaway views, blade thicknesses can be seen, which can vary with respect to axial and radial dimensions. In each of the cutaway views, a flat, planar surface is visible that is formed by a portion of the hub and a portion of the blades. As mentioned with respect to FIG. 9, the hub can be represented in part by a radius (e.g., or a diameter), where the radius may decrease in a direction from the backdisk to the nose (e.g., from Z1 to Z8). In the various cutaway views, the blades can appear to be increasing in length from the hub (e.g., as the hub radius becomes smaller); noting that a transition may occur at the end of the leading edge (e.g., tip of a leading edge), which meets the shroud edge. As an example, for a mixed-flow turbine wheel, a leading edge of a blade may extend beyond a backdisk such that at least a portion of a leading edge can have a radius that is greater than a backdisk radius. For example, consider the cutaway view at Z6 where, for a mixed-flow turbine wheel, the leading edge extends to a radius that is greater than that of the backdisk.

Figure 12:
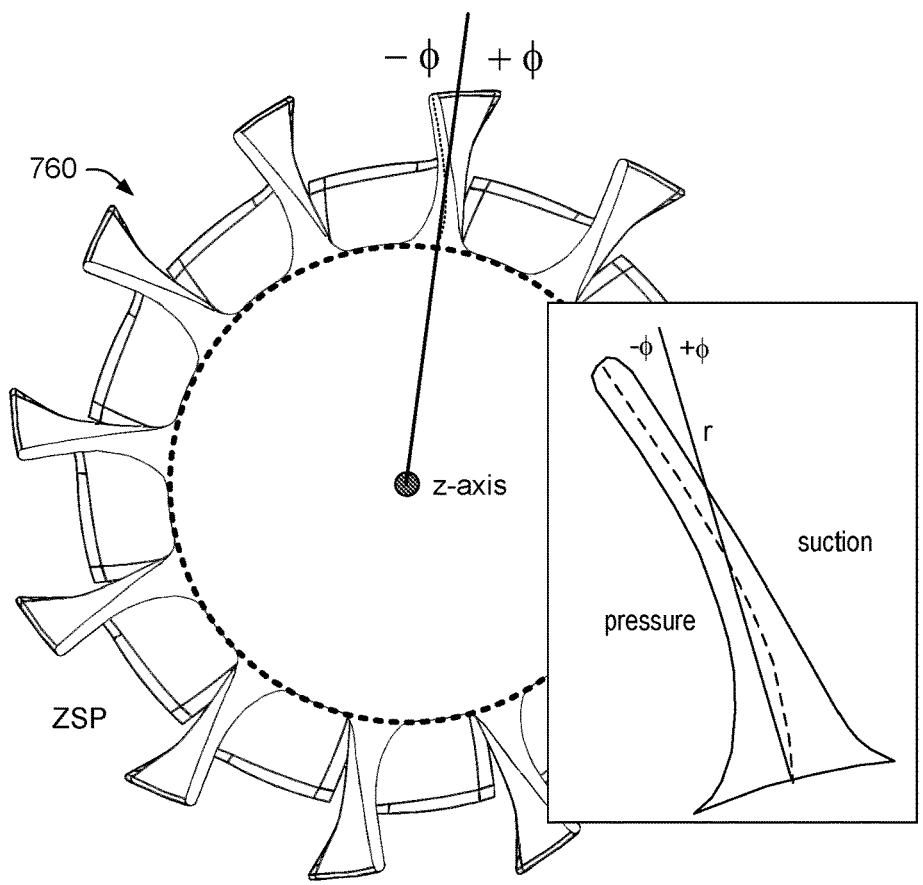
FIG. 12 is a series of plan, cutaway views of the turbine wheel of FIG. 7.
Figure 12:
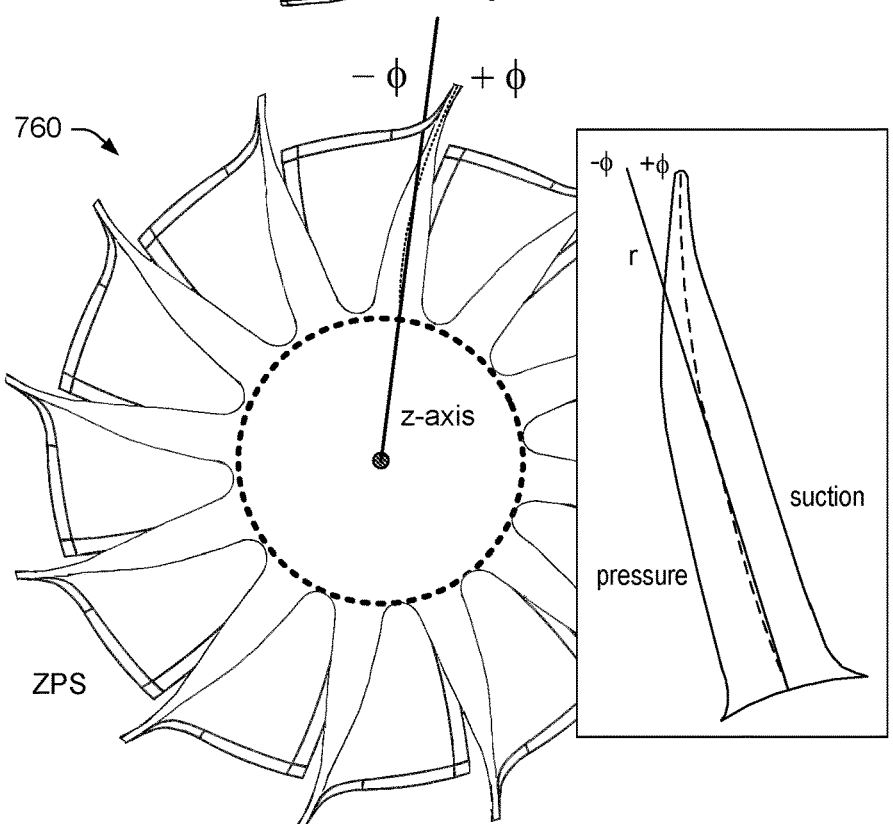

FIG. 12 shows two cross-sectional, cutaway views of the turbine wheel 760 looking from the backdisk side where, closer to the backdisk at a z-axis position of ZSP (see, e.g., the plot 1030 of FIG. 10 and the axial position of approximately 10 percent), the blades have a zero lean angle at the hub, then a positive lean angle toward the suction side, then a zero lean angle, and then a negative lean angle toward the pressure side. Closer to the nose at a z-axis position of ZPS (see, e.g., the plot 1030 of FIG. 10 and the axial position of approximately 60 percent), the blades have a zero lean angle at the hub, then a negative lean angle toward the pressure side, then a zero lean angle, and then a positive lean angle toward the suction side.

In such a turbine wheel, the blades transition in moving axially from the backdisk to the nose of the turbine wheel where the transition occurs in an axial range, which may be defined by a height of the leading edge (L.E.).

Figure 13:
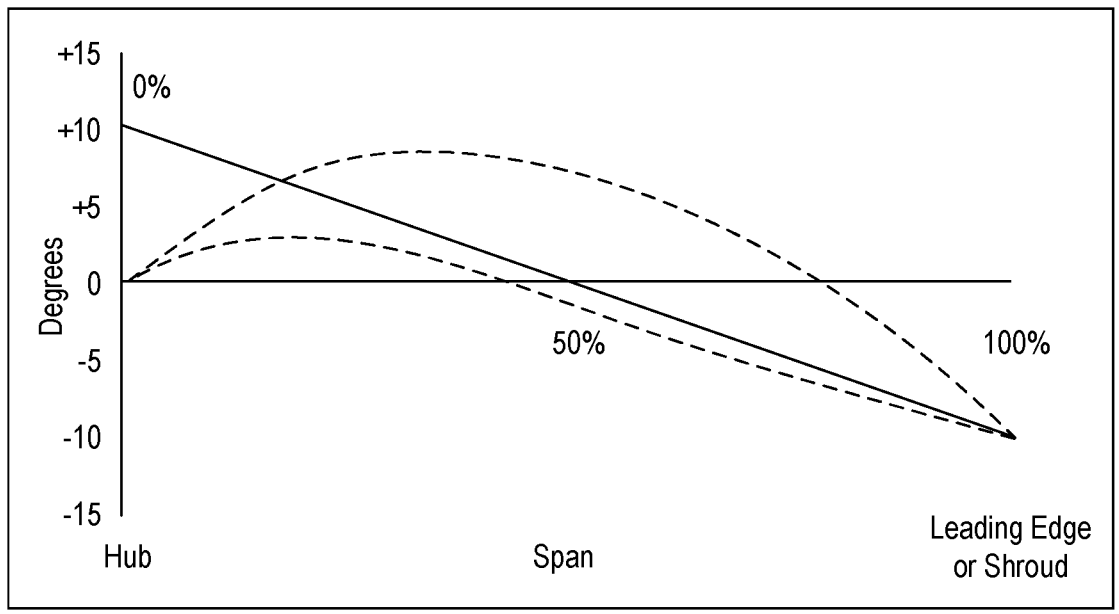
FIG. 13 is a series of example plots that define a lean angle as being zero, positive or negative.
Figure 13:
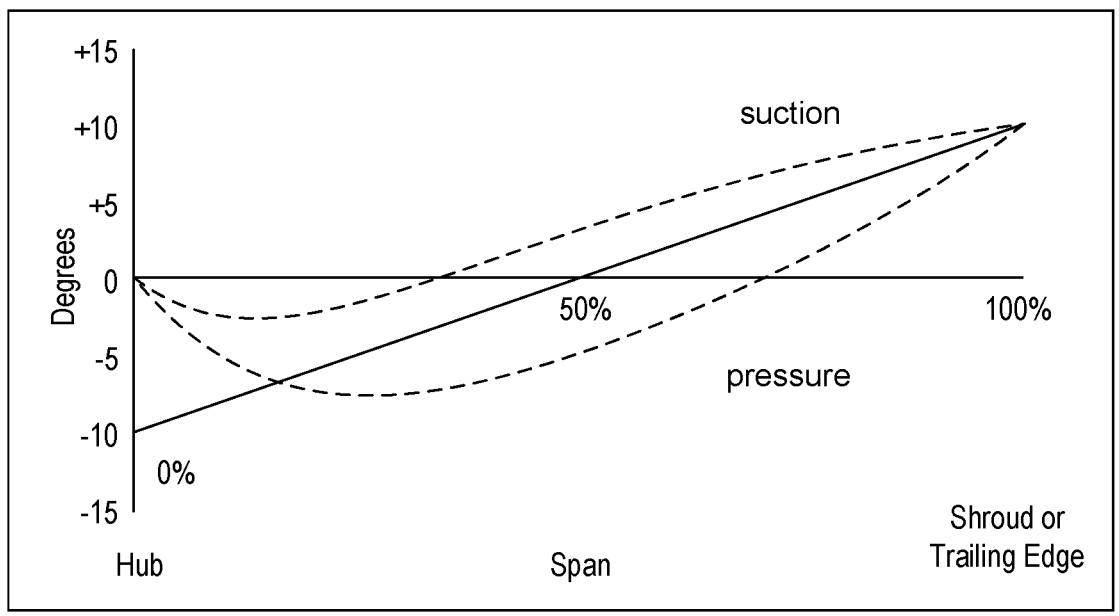

FIG. 13 shows two example plots 1310 and 1320 of lean angle distribution versus span where the plot 1310 corresponds to an inducer portion and where the plot 1320 corresponds to an exducer portion. As an example, a transition from an inducer portion to an exducer portion can be within an axial height range of approximately 20 percent to approximately 80 percent of a maximum axial height of a hub profile.

As shown in the plot 1310, the lean angles can range from approximately +10 degrees to approximately −10 degrees where the lean angle distribution includes two lean angles of 0 degrees where one of the 0 degree lean angles is at the hub and the other is in a range from approximately 20 percent to approximately 80 percent of the span (e.g., a radial span).

As shown in the plot 1320, the lean angles can range from approximately −10 degrees to approximately +10 degrees where the lean angle distribution includes two lean angles of 0 degrees where one of the 0 degree lean angles is at the hub and the other is in a range from approximately 20 percent to approximately 80 percent of the span (e.g., a radial span).

As mentioned, a turbine wheel, a shaft and wheel assembly (SWA), a turbine wheel blade, etc., may be described with respect to features shown in one or more of FIGS. 1 to 13. For example, a turbine wheel can include blades where the turbine wheel can include one or more features described in FIGS. 4 to 13. The example turbine wheel 760 includes blades that extend outwardly from a hub, where each of the blades includes a shroud edge (e.g., S.E.), a leading edge (e.g., L.E.), a trailing edge (e.g., T.E.), a pressure side (e.g., P.S.), and a suction side (e.g., S.S.), where the shroud edge includes a minimum axial coordinate position where the shroud edge meets the leading edge, and a maximum axial coordinate position where the shroud edge meets the trailing edge.

As explained, turbine blades are traditionally radially stacked, meaning that at a given meridional location, the lean angle from hub to shroud is constant (representable by a straight radial filament), which is done to minimize stresses at the blade, and blade root fillet, as well as, to facilitate manufacturability. However, gains can be achieved in aerodynamic performance by using non-radially stacked blades.

As an example, a turbocharger turbine wheel can include a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes an inducer portion and an exducer portion, where, in the inducer portion, in a direction outwardly from the hub, each of the blades includes positive lean angles, a zero lean angle and negative lean angles and where, in the exducer portion, in a direction outwardly from the hub, each of the blades includes negative lean angles, a zero lean angle and positive lean angles. In such an example, the negative lean angles can be less than or equal to −10 degrees and/or the positive lean angles are less than or equal to +10 degrees. As an example, a turbocharger turbine wheel can include blades where each blade can include negative lean angles are less than or equal to −10 degrees and positive lean angles are less than or equal to +10 degrees. In such an example, each blade includes at least one negative lean angle less than zero degrees and at least one positive lean angle greater than zero degrees.

As an example, each blade of a turbine wheel can include, in an inducer portion, positive lean angles, a zero lean angle and negative lean angles and, in an exducer portion, negative lean angles, a zero lean angle and positive lean angles. In such an example, the zero lean angles can be within a range of approximately 20 percent to approximately 80 percent of a radial span of each blade.

As an example, a turbine wheel can include a transition between an inducer portion and an exducer portion that can be within a range of approximately 20 percent to approximately 80 percent of an axial span from a lowermost point of each blade along a hub and an uppermost point of each blade along the hub.

As an example, an inducer portion includes at least a portion of a leading edge of a blade. As an example, an exducer portion includes at least a portion of a trailing edge of a blade.

As an example, a turbocharger turbine wheel can include mixed inlet flow blades and/or radial inlet flow blades.

As an example, a turbocharger turbine wheel can include blades where each of the blades is defined in part by a rake angle. For example, consider a rake angle that is at least 30 degrees and/or less than or equal to 70 degrees.

As an example, a positive lean angle can be toward a blade suction side and a negative lean angle can be toward a blade pressure side.

As an example, a turbocharger turbine wheel can include blades where each of the blades includes a shroud edge, a leading edge, a trailing edge, a pressure side, and a suction side, where the shroud edge includes a minimum axial coordinate position where the shroud edge meets the leading edge and a maximum axial coordinate position where the shroud edge meets the trailing edge.

As an example, a turbocharger turbine wheel can include a number of blades where the number of the blades is selected from a range of 3 blades to 30 blades.

As an example, a turbocharger can include a compressor assembly; a center housing assembly operatively coupled to the compressor assembly; and a turbine assembly operatively coupled to the center housing assembly, where the turbine assembly includes a turbine wheel that includes a hub that includes a rotational axis, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes an inducer portion and an exducer portion, where, in the inducer portion, in a direction outwardly from the hub, each of the blades includes positive lean angles, a zero lean angle and negative lean angles and where, in the exducer portion, in a direction outwardly from the hub, each of the blades includes negative lean angles, a zero lean angle and positive lean angles.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger turbine wheel comprising:
   a hub that comprises a rotational axis, a backdisk and a nose, wherein the rotational axis defines an axial coordinate (z) in a cylindrical coordinate system that comprises a radial coordinate (r) and an azimuthal coordinate (Θ) in a direction of intended rotation about the rotational axis; and
   blades that extend outwardly from the hub, wherein each of the blades comprises an inducer portion and an exducer portion,
      wherein, in the inducer portion, in a direction outwardly from the hub, each of the blades comprises positive lean angles, a zero lean angle and negative lean angles and
      wherein, in the exducer portion, in a direction outwardly from the hub, each of the blades comprises negative lean angles, a zero lean angle and positive lean angles.

2. The turbocharger turbine wheel of claim 1, wherein the negative lean angles are less than or equal to −10 degrees.

3. The turbocharger turbine wheel of claim 1, wherein the positive lean angles are less than or equal to +10 degrees.

4. The turbocharger turbine wheel of claim 1, wherein the negative lean angles are less than or equal to −10 degrees and wherein the positive lean angles are less than or equal to +10 degrees.

5. The turbocharger turbine wheel of claim 1, wherein the zero lean angles are within a range of approximately 20 percent to approximately 80 percent of a radial span of each of the blades.

6. The turbocharger turbine wheel of claim 1, wherein a transition between the inducer portion and the exducer portion is within a range of approximately 20 percent to approximately 80 percent of an axial span from a lowermost point of each of the blades along the hub and an uppermost point of each of the blades along the hub.

7. The turbocharger turbine wheel of claim 1, wherein the inducer portion comprises at least a portion of a leading edge of each of the blades.

8. The turbocharger turbine wheel of claim 1, wherein the exducer portion comprises at least a portion of a trailing edge of each of the blades.

9. The turbocharger turbine wheel of claim 1, wherein the blades comprise mixed inlet flow blades.

10. The turbocharger turbine wheel of claim 1, wherein the blades comprise radial inlet flow blades.

11. The turbocharger turbine wheel of claim 1, wherein a positive lean angle is toward a blade suction side and wherein a negative lean angle is toward a blade pressure side.

12. The turbocharger turbine wheel of claim 1, wherein each of the blades comprises a shroud edge, a leading edge, a trailing edge, a pressure side, and a suction side, wherein the shroud edge comprises a minimum axial coordinate position where the shroud edge meets the leading edge and a maximum axial coordinate position where the shroud edge meets the trailing edge.

13. The turbocharger turbine wheel of claim 1 wherein a number of the blades is selected from a range of 3 blades to 30 blades.

14. The turbocharger turbine wheel of claim 1, wherein each of the blades is defined in part by a rake angle.

15. The turbocharger turbine wheel of claim 14, wherein the rake angle is at least 30 degrees.

16. The turbocharger turbine wheel of claim 15, wherein the rake angle is less than or equal to 70 degrees.

17. A turbocharger comprising:
a compressor assembly;
a center housing assembly operatively coupled to the compressor assembly; and
a turbine assembly operatively coupled to the center housing assembly, wherein the turbine assembly comprises a turbine wheel that comprises
a hub that comprises a rotational axis, a backdisk and a nose, wherein the rotational axis defines an axial coordinate (z) in a cylindrical coordinate system that comprises a radial coordinate (r) and an azimuthal coordinate (Θ) in a direction of intended rotation about the rotational axis; and
blades that extend outwardly from the hub, wherein each of the blades comprises an inducer portion and an exducer portion,
wherein, in the inducer portion, in a direction outwardly from the hub, each of the blades comprises positive lean angles, a zero lean angle and negative lean angles and
wherein, in the exducer portion, in a direction outwardly from the hub, each of the blades comprises negative lean angles, a zero lean angle and positive lean angles.

* * * * *